United States Patent Office 3,502,773
Patented Mar. 24, 1970

3,502,773
METHOD FOR CONTROLLING ECTOPARASITE TRICHOMONAL INFESTATION WITH 6-METHOXY-1-PHENAZINOL-5,10-DIOXIDE
Emanuel Grunberg, North Caldwell, N.J., assignor to Hoffmann-La Roche Inc., Nutley, N.J., a corporation of New Jersey
No Drawing. Filed May 26, 1967, Ser. No. 641,461
Int. Cl. A61k 27/00
U.S. Cl. 424—250     1 Claim

ABSTRACT OF THE DISCLOSURE

Pharmaceutical compositions containing 6-methoxy-1-phenazinol 5,10-dioxide and methods for the treatment of ectoparasitic infestations.

BRIEF DESCRIPTION OF THE INVENTION

This invention relates to novel pharmaceutical compositions and their use in the treatment of infectious diseases due to the invasion of an animal host by pathogenic organisms. More particularly, this invention relates to novel pharmaceutical compositions containing 6-methoxy-1-phenazinol 5,10-dioxide and their use in the control and treatment of parasitic disease.

DETAILED DESCRIPTION OF THE INVENTION 6-methoxy-1-phenazinol 5,10-dioxide has unexpectedly been found to possess marked activity against ectoparasites. It has been found to be particularly effective against parasitic protozoa. For example, 6-methoxy-1-phenazinol 5,10-dioxide can be effectively employed to combat *Trichomonas vaginalis*, which is the etiologic agent of a very troublesome form of vaginal infestation known as *Trichomonas vaginalis* vaginitis or vulvovaginitis. 6-methoxy-1-phenazinol 5,10-dioxide has also been found to be active against *Trichomonas foetus*, which infects animals and causes abortion in cattle. The ectoparasiticidal uses of 6-methoxy-1-phenazinol 5,10-dioxide are not limited to the foregoing exemplified applications since it has been found that 6-methoxy-1-phenazinol 5,10-dioxide is active against protozoa especially trichomonads in other extra-vaginal as well as vaginal foci.

Thus a comprehensive embodiment of the present invention comprises the use of 6-methoxy-1-phenazinol 5,10-dioxide as an ectoparasiticide. The use of preparations containing 6-methoxy-1-phenazinol 5,10-dioxide to combat parasitic protozoa, particularly *Trichomonas vaginalis*, constitutes a preferred embodiment. In another particular embodiment, the present invention provides pharmaceutical compositions which contain 6-methoxy-1-phenazinol 5,10-dioxide and which are suited for topical administration.

The in vivo anti-parasitic activity of 6-methoxy-1-phenazinol 5,10-dioxide was demonstrated by the following procedure.

Albino mice weighing 18–20 g. were infected subcutaneously on the ventral surface with approximately 750,000 cells from a 24 hour simplified trypticase serum broth culture.

The animals were treated subcutaneously at the site of infection at one and twenty-four hours after infection. The animals treated subcutaneously were sacrificed seventy-two (72) hours after infection and examined for the presence or absence of lesions. This test showed 6-methoxy-1-phenazinol 5,10-dioxide to have marked antitrichomonal activity when administered locally. The $CD_{50}$ calculated according to the method of Reed and Muench, Am. J. Hyg. 1938, vol. 27, page 493, was 3.5 mcg. per ml. This anti-parasitic property coupled with the low toxicity renders 6-methoxy-1-phenazinol 5,10-dioxide extremely well suited for the use in treatment of parasitic infestations of human and animal hosts. The acute toxicity of 6-methoxy-1-phenazinol, 5,-10-dioxide is shown in the following table:

Table I.—Acute toxicity for mice

| Route of administration: | $LD^{50}$ (mg./kg.) |
|---|---|
| Peros | >2000 |
| Subcutaneous | >2000 |
| Intraperitoneal | 133 |

The high degree of activity and low toxicity demonstrated by biological tests in a warm blooded animal as indicated herein permits the use of 6-methoxy-1-phenazinol 5,10-dioxide in therapy by topical application in the same general manner as triclobisonium chloride. This latter compound exhibits antitrichomonal activity in the above described test giving a $CD_{50}$ of 65 mcg. per ml. (calculated according to the method of Reed and Muench). The 6-methoxy-1-phenazinol 5,10-dioxide and pharmaceutical compositions containing 6-methoxy-1-phenazinol 5,10-dioxide thus demonstrate a pattern of activity associated with potent ectoparasiticides of known clinical efficacy and are useful as topical ectoparasiticidal agents in the treatment of such infectious diseases as vulvovaginitis.

In general 6-methoxy-1-phenazinol 5,10-dioxide can be readily prepared from the well-known antibiotic iodinin by methylation with dimethyl sulfate in the presence of alkali. This as well as other methods for the preparation of 6-methoxy-1-phenazinol, 5,10-dioxide are set forth for example in Tetrahedron Letters No. 8, pp. 715–718, 1967.

6-methoxy-1-phenazinol 5,10-dioxide is a red crystalline solid relatively insoluble in water though soluble in organic solvents for example, in methanol at 1 mg./g. and in pharmaceutically acceptable solvents, for example, its solubility in polyethylene glycol 400 is 2.0 mg./g. and 0.35 mg./g. in polypropylene glycol. Thin layer chromatographic assay of ointment compositions prepared according to this invention showed no breakdown of 6-methoxy-1-phenazinol 5,10-dioxide thereby indicating good stability when formulated into pharmaceutical forms for topical administration. Tinctures should be protected from extended exposure to light, particularly ultra-violet.

For the treatment of ectoparasitic infestations, 6-methoxy-1-phenazinol 5,10-dioxide can be suitably formulated in any of the usual forms suited to topical application. It can be formulated into solutions or suspensions using medicinally acceptable liquids such as, polyethylene glycol, polypropylene glycol and the like. Generally, such solutions and suspensions should contain at least about .025 percent to .25 percent by weight of 6-methoxy-1-phenazinol 5,10-dioxide. Other formulations suitable for topical administration include powders, creams, salves, tinctures, suppositories, douche preparations and the like for use in the treatment of such infectious diseases as *Trichomonas vaginalis* vaginitis.

The formulations of this invention can be used for example, locally in suppository form or insufflated in the form of a powder containing one to ten percent of 6- methoxy-1-phenazinol 5,10-dioxide in a mixture of equal parts of kaolin and sodium bicarbonate. The single dose of powder is 5 g. containing .05 g. to .5 g. of 6-methoxy-1-phenazinol 5,10-dioxide administered by insufflation. For extravaginal applications, the powder can be simply administered by dusting onto the infected area.

6-methoxy-1-phenazinol 5,10-dioxide can be formulated with suitable excipients in the form of vaginal inserts or vaginal suppositories containing from .05 g. to .1 g. of the active ingredient and may be administered twice daily for periods of time from two to several weeks.

Suitable ointment formulations can be prepared by compounding 6-methoxy-1-phenazinol 5,10-dioxide with conventional ointment bases. Carriers having lipophilic properties are employed in the preferred embodiment of the topical formulations of this invention. Such ointment formulations will ordinarily contain 6-methoxy-1-phenazinol 5,10-dioxide in amounts between about .025 percent to .25 percent by weight. Ointments or creams can be administered by applying to the infected area three or four times daily. They can be applied by rubbing the ointment gently on the infected area. The preparation of suitable formulations will be more fully understood from the specific examples for the preparation of such formulations which are included below. In general, suitable topical preparations can be prepared by combining 6-methoxy-1-phenazinol 5,10-dioxide with any of the usual diluents, solvents, suspending agents, fillers, excipients, adhesives, coloring agents and fragrances. Other local agents intended to help restore the infected area to its normal state can also be incorporated into the formulations or applied in conjunction therewith. Wetting agents, detergents and the like may also be employed to aid in the penetration through the layers of mucous, etc. to the site in which the protozoa may be buried. Generally the pharmaceutical formulations of this invention will contain at least about 0.1 percent by weight of 6-methoxy-1-phenazinol 5,10-dioxide. Under ordinary situations more highly concentrated compositions e.g. compositions containing 1 to 10 percent by weight of 6-methoxy-1-phenazinol 5,10-dioxide will be more useful. In the treatment of ectoparasitic infections in human hosts, the frequency of administration of the compositions of this invention will vary depending upon the amount of 6-methoxy-1-phenazinol 5,10-dioxide present in the composition and upon the needs and requirements of the patient as determined by the attending physician. Thus depending upon the nature of the infection and the particular topical formulation, the composition can be varied to contain greater or less amounts of active substance than specifically indicated herein or can be administered with greater or less frequency than mentioned above.

The invention will be more fully understood from the following examples which are intended as illustrative of the invention and are not to be construed as a limitation thereof.

EXAMPLE 1

Creams containing varying concentrations of 6-methoxy-1-phenazinol 5,10-dioxide were prepared by mixing stearic acid, light mineral oil, Span 60, (sorbitan monostearate manufactured by Atlas Powder Company, Wilmington, Del.) and cetyl alcohol. The mixture was melted and maintained at a temperature of 70° C. Sorbitol and Tween 60 (sorbitan monostearate polyoxyalkylene derivative manufactured by Atlas Powder Co., Wilmington, Del.) were dissolved in distilled water and added *slowly* with agitation to the above mixture maintained at a temperature of 70° C. The resulting emulsion was slowly cooled to 45° C. A slurry of 6-methoxy-1-phenazinol 5,10-dioxide was prepared by stirring in propylene glycol and passing through a colloid mill at a fine setting. The slurry was then added to the previously prepared emulsion at 45° C. The completed cream was mixed well and cooled slowly at room temperature. The final composition of two exemplary creams prepared in this way is shown below:

CREAMS

|  | A | B |
|---|---|---|
|  | Gm./kg. | Gm./kg. |
| Stearic acid | 200.00 | 200.000 |
| Mineral oil light | 13.50 | 13.500 |
| Span 60 | 22.50 | 22.500 |
| Cetyl alcohol | 5.00 | 5.000 |
| Sorbo | 45.00 | 45.000 |
| Tween 60 | 16.00 | 16.000 |
| Distilled water | 378.00 | 378.000 |
| Propylene glycol | 348.98 | 349.745 |
| 6-methoxy-1-phenazinol 5,10-dioxide | 1.02 | 0.255 |
|  | 1,030.00 | 1,030.000 |

The above compositions exhibit anti-trichomonad activity, when tested in mice as described hereinabove, at the following dose levels:

Composition:            $CD_{50}$ (mcg./ml.) [1]
    Cream A _____ 0.9
    Cream B _____ 0.46–0.9

[1] Based on content of 6-methoxy-1-phenazinol 5,10-dioxide; cream suspended in water.

EXAMPLE 2

Pharmaceutically acceptable solutions of 6-methoxy-1-phenazinol, 5,10-dioxide at varying concentrations are prepared by dissolving the 6-methoxy-1-phenazinol 5,10-dioxide in a polyhydroxy alcohol solvent at 70° C. cooling to room temperature and passing the solution through a No. 1 Whatman filter paper. The following solutions were obtained in this way:

|  | No. One, gm./kg. | No. Two, gm./kg. | No. Three, gm./kg. |
|---|---|---|---|
| 6-methoxy-1-phenazinol 5,10-dioxide | 1.02 | 0.255 | 0.255 |
| Polyethylene Glycol 400 | 998.98 | 999.745 |  |
| Propylene Glycol |  |  | 999.745 |

The above solutions exhibit anti-trichomonad activity when tested in mice as described hereinabove, at the following dose levels—

Composition:            $CD_{50}$ (mcg./ml.) [1]
    Solution No. One _____ 2–6
    Solution No. Two _____ 3–7
    Solution No. Three _____ 1.2–4

[1] Based on content of 6-methoxy-1-phenazinol 5,10-dioxide.

EXAMPLE 3

Suppositories containing 6-methoxy-1-phenazinol 5,10-dioxide in varying amounts were prepared by heating Wecobee R (a refined synthetic cocoa butter, coconut derived having an excipient melting point of 32° C. minimum, available from Drew Chemical Corp., New York, N.Y.) and propylene glycol monostearate to 60–65° C., until both were completely melted. A slurry of 6-methoxy-1-phenazinol 5,10-dioxide in polyethylene glycol 400 monooleate was prepared and passed through a colloid mill at a fine setting. The slurry was added to the previously prepared melt with stirring until a homogeneous melt was obtained. The melt was gradually cooled to 40° C., poured into a clean, cool, closed suppository mold, chilled and removed.

EXAMPLE 4

Pharmaceutically acceptable tinctures containing 6-methoxy-1-phenazinol 5,10-dioxide at varying concentrations were prepared by dissolving 6-methoxy-1-phenazinol 5,10-dioxide in 70 percent alcohol and passing the solution through a No. 1 Whatman filter paper. Tinctures prepared in this way have the following compositions:

|  | No. One | No. Two |
|---|---|---|
| 6-methoxy-1-phenazinol 5,10-dioxide, mg./cc | 1.02 | 0.255 |
| Ethyl Alcohol 70 percent qs ad, cc | 1.00 | 1.00 |

I claim:
1. A method for controlling ectoparasitic trichomonal infestation in animals which comprises administering an effective amount of a topical composition containing 6-methoxy-1-phenazinol-5,10-dioxide and a medicinally acceptable carrier on the site of the infestation.

References Cited

Chem. Abstracts (1) 64: 20233h, (June 20, 1966) citing Petersen et al., Can. J. Microbiol. 12 (2), 221–30 (1966).

Chem. Abstracts (2) 66: 10903y (Jan. 16, 1967).

Chem. Abstracts (3) 66: 94998u (May 22, 1967).

ALBERT T. MEYERS, Primary Examiner

S. J. FRIEDMAN, Assistant Examiner